(12) United States Patent
Gao et al.

(10) Patent No.: US 12,211,492 B2
(45) Date of Patent: Jan. 28, 2025

(54) VOICE WAKE-UP METHOD AND APPARATUS, ELECTRONIC DEVICE, AND READABLE STORAGE MEDIUM

(71) Applicant: SHENZHEN MICROBT ELECTRONICS TECHNOLOGY CO., LTD., Shenzhen (CN)

(72) Inventors: Sibin Gao, Shenzhen (CN); Guo Ai, Shenzhen (CN); Zuoxing Yang, Shenzhen (CN); Ruming Fang, Shenzhen (CN); Zhihong Xiang, Shenzhen (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/715,548

(22) PCT Filed: Nov. 14, 2022

(86) PCT No.: PCT/CN2022/131656
§ 371 (c)(1),
(2) Date: May 31, 2024

(87) PCT Pub. No.: WO2023/098459
PCT Pub. Date: Jun. 8, 2023

(65) Prior Publication Data
US 2024/0420685 A1     Dec. 19, 2024

(30) Foreign Application Priority Data
Dec. 3, 2021  (CN) .......................... 202111460653.4

(51) Int. Cl.
*G10L 25/93*     (2013.01)
*G10L 15/02*     (2006.01)
(Continued)

(52) U.S. Cl.
CPC .............. *G10L 15/16* (2013.01); *G10L 15/02* (2013.01); *G10L 15/04* (2013.01); *G10L 25/78* (2013.01)

(58) Field of Classification Search
None
See application file for complete search history.

(56) References Cited

U.S. PATENT DOCUMENTS 8,135,580 B1 * 3/2012 Jin ........................ G06F 40/247
                                                    704/7
11,205,445 B1 * 12/2021 Sharma .............. H04N 21/4666
(Continued)

FOREIGN PATENT DOCUMENTS

| CN | 109978145 A | 7/2019 |
| CN | 110473539 A | 11/2019 |

(Continued)

OTHER PUBLICATIONS

International Search Report for Application No. PCT/CN2022/131656 dated Feb. 10, 2023.
(Continued)

*Primary Examiner* — Jakieda R Jackson
(74) *Attorney, Agent, or Firm* — MARSHALL, GERSTEIN & BORUN LLP

(57) ABSTRACT

Embodiments of the present disclosure provide a voice wake-up method, apparatus, electronic device, and readable storage medium. The method includes: acquiring a deep feature encoded by a voice activity detection (VAD) encoding layer through a VAD decoding layer, the deep feature being extracted from a digital audio signal used for VAD encoding and voice wake-up encoding; determining whether each audio segment in the digital audio signal is a voice according to a probability that each audio frame in the digital audio signal is a voice frame, each audio segment including a plurality of audio frames; and when determining that the (Continued)

audio segment is the voice, indicating, by the VAD decoding layer, to input a deep feature of the audio segment into a voice wake-up decoding layer to perform voice wake-up. The embodiments of the present disclosure improve the accuracy of voice wake-up.

16 Claims, 2 Drawing Sheets

(51) Int. Cl.
  *G10L 15/04* (2013.01)
  *G10L 15/16* (2006.01)
  *G10L 25/78* (2013.01)

(56) References Cited

U.S. PATENT DOCUMENTS

| | | | |
|---|---|---|---|
| 11,521,599 B1* | 12/2022 | Jose | G06F 17/15 |
| 11,557,292 B1* | 1/2023 | Wang | G10L 15/16 |
| 11,900,921 B1* | 2/2024 | Gupta | G10L 15/22 |
| 11,915,690 B1* | 2/2024 | Chang | G10L 19/008 |
| 2020/0193979 A1* | 6/2020 | Sun | G10L 15/20 |
| 2020/0219502 A1 | 7/2020 | Wang et al. | |
| 2021/0174805 A1* | 6/2021 | Wang | G10L 25/63 |
| 2021/0326421 A1* | 10/2021 | Khoury | G10L 17/08 |
| 2022/0129687 A1* | 4/2022 | Munir | G06F 18/24 |
| 2022/0157298 A1* | 5/2022 | Moreno | G10L 17/20 |
| 2022/0180894 A1* | 6/2022 | Sha | G10L 25/30 |
| 2022/0375492 A1* | 11/2022 | Grangier | G10L 15/063 |

FOREIGN PATENT DOCUMENTS

| | | |
|---|---|---|
| CN | 111599382 A | 8/2020 |
| CN | 111710332 A | 9/2020 |
| CN | 112530424 A | 3/2021 |
| CN | 112562742 A | 3/2021 |
| CN | 113920988 A | 1/2022 |
| CN | 113920988 B | 3/2022 |

OTHER PUBLICATIONS

First Search in corresponding Chinese Application No. 202111460653.4.
First Office Action in corresponding Chinese Application No. 202111460653.4, dated Jan. 18, 2022.
Second Office Action in corresponding Chinese Application No. 202111460653.4, dated Feb. 9, 2022.
Notification to Grant Patent Right for Invention for corresponding Chinese Application No. 202111460653.4, dated Feb. 22, 2022.

* cited by examiner

VOICE WAKE-UP METHOD AND APPARATUS, ELECTRONIC DEVICE, AND READABLE STORAGE MEDIUM

CROSS-REFERENCE TO RELATED APPLICATIONS

This application is a national stage application of International Patent application No. PCT/CN2022/131656 filed Nov. 14, 2022, entitled "VOICE WAKE-UP METHOD AND APPARATUS, ELECTRONIC DEVICE, AND READABLE STORAGE MEDIUM", which claims the benefit and priority to Chinese Patent Application No. 202111460653.4, entitled "VOICE WAKE-UP METHOD, APPARATUS, AND READABLE STORAGE MEDIUM" and filed to China National Intellectual Property Administration on Dec. 3, 2021, the entire disclosures of which are incorporated herein by reference.

TECHNICAL FIELD

Embodiments of the present disclosure relate to the field of voice processing technologies, and particularly to a voice wake-up method, apparatus, electronic device, and readable storage medium, and a computer program product.

BACKGROUND

At present, interactive products such as smart speakers are widely used, and voice interaction has become the most direct control method, thereby making human-computer interaction more intelligent and humanized. In the related art, voice wake-up is an important step in a voice interaction process.

In various interactive products, in order to improve the voice wake-up rate and reduce the false wake-up rate, voice activity detection (VAD) is usually performed on the collected audio, and only the audio detected as a voice can be inputted into a voice wake-up model for wake-up judgment. However, in order to enable the voice wake-up model to quickly determine whether the inputted voice is a wake-up word and thus reduce the waiting time of a user, a VAD module at the front end usually uses a traditional signal processing algorithm, and even a combination judgment method of simple indicators such as short-term energy and short-time average zero-crossing rate. Although the VAD method based on the traditional signal processing algorithm can reduce the judgment time of the VAD module, it is easy to misjudge a non-voice into a voice and input it into the wake-up model, thereby resulting in false wake-up.

SUMMARY

Embodiments of the present disclosure provide a voice wake-up method, apparatus, electronic device, and readable storage medium, and a computer program product, to improve the accuracy of voice wake-up.

The technical solutions provided by the embodiments of the present disclosure are implemented as follows.

The embodiments of the present disclosure provide a voice wake-up method, including:

acquiring a deep feature encoded by a voice activity detection (VAD) encoding layer through a VAD decoding layer, the deep feature being extracted from a digital audio signal used for VAD encoding and voice wake-up encoding;

determining whether each audio segment in the digital audio signal is a voice according to a probability that each audio frame in the digital audio signal is a voice frame, each audio segment including a plurality of audio frames; and when determining that the audio segment is the voice, indicating, by the VAD decoding layer, to input a deep feature of the audio segment into a voice wake-up decoding layer to perform voice wake-up.

The embodiments of the present disclosure provide a VAD apparatus, including:

an acquisition module, configured to acquire a deep feature encoded by a VAD encoding layer, the deep feature being extracted from a digital audio signal used for VAD encoding and voice wake-up encoding;

a determination module, configured to determine whether each audio segment in the digital audio signal is a voice according to a probability that each audio frame in the digital audio signal is a voice frame, each audio segment including a plurality of audio frames; and an output module, configured to, when determining that the audio segment is the voice, indicate to input a deep feature of the audio segment into a voice wake-up decoding layer to perform voice wake-up.

The embodiments of the present disclosure provide a voice wake-up system, including a VAD encoding layer, a voice wake-up decoding layer, and the VAD decoding layer as described in some embodiments.

The embodiments of the present disclosure provide an electronic device, including a processor and a memory, where the memory stores a computer program which, when executed by the processor, causes the processor to perform the voice wake-up method as described in some embodiments.

The embodiments of the present disclosure provide a non-transitory computer-readable storage medium storing instructions which, when executed by a processor, cause the processor to perform the voice wake-up method as described in some embodiments.

The embodiments of the present disclosure provide a computer program product, including a computer program or instructions which, when executed by a processor, cause the processor to perform the voice wake-up method as described in some embodiments.

In the embodiments of the present disclosure, the deep feature of the digital audio signal is extracted, the probability that each audio frame in the digital audio signal is a voice frame, and it is determined whether the audio segment is a voice according to the probability. Only the deep feature of the audio segment determined as the voice is inputted into a voice wake-up decoding layer neural network model for wake-up judgment, thereby improving the accuracy of voice wake-up.

BRIEF DESCRIPTION OF THE DRAWINGS

In order to describe the technical solutions provided by the embodiments of the present disclosure, the accompanying drawings referred to in the embodiments will be illustrated briefly hereinafter. Obviously, these accompanying drawings are some embodiments of the present disclosure, and according to these accompanying drawings, those skilled in the art can obtain other accompanying drawings without creative labor.

DETAILED DESCRIPTION

The technical solutions provided by the embodiments of the present disclosure will be clearly and completely described below in conjunction with the accompanying drawings. Obviously, the described embodiments are only some embodiments of the present disclosure, but are not all embodiments. According to the embodiments of the present disclosure, other embodiments obtained by those skilled in the art without creative labor all fall within the protection scope of the present disclosure.

The terms "first", "second", "third", "fourth", and the like (if any) in the specification, claims and accompanying drawings of the present disclosure are used to distinguish similar objects, but are not used to describe a specific order or sequence. These terms may be exchanged in some embodiments, and thus these embodiments may be implemented in an executing order different from those of the embodiments described herein. Further, the terms "include/comprise" and "have", as well as any variations thereof, are intended to cover a non-exclusive inclusion. For example, a process, method, system, product, or device that includes a series of steps or units is not limited to those explicitly listed steps or units, but may include other steps or units that are not explicitly listed or inherent to such process, method, product, or device.

The technical solutions of the present disclosure will be described in detail hereinafter according to some embodiments. The following embodiments may be combined with each other, and the same or similar concepts or processes may not be repeated in some embodiments.

Figure 1:
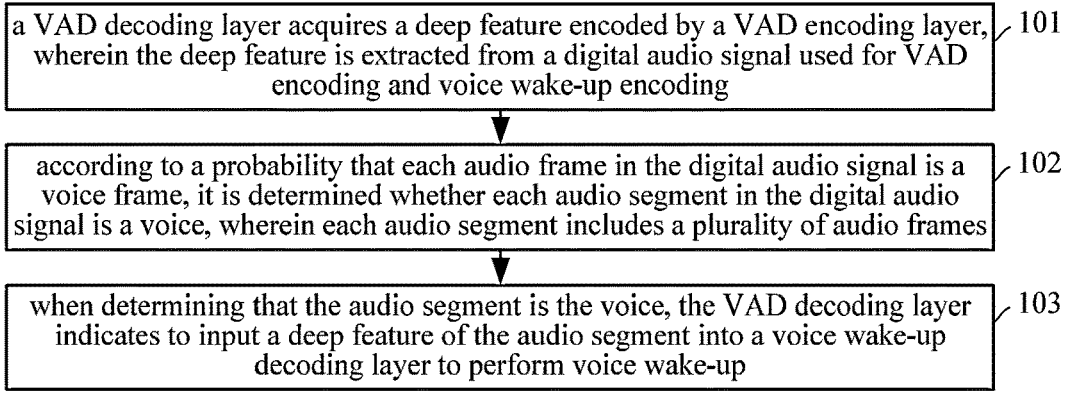
FIG. 1 is a flowchart of a voice wake-up method according to some embodiments of the present disclosure.

FIG. 1 is a flowchart of a voice wake-up method according to some embodiments of the present disclosure. The voice wake-up method may include steps 101-103.

At step 101, a VAD decoding layer acquires a deep feature encoded by a VAD encoding layer, where the deep feature is extracted from a digital audio signal used for VAD encoding and voice wake-up encoding.

At Step 102, according to a probability that each audio frame in the digital audio signal is a voice frame, it is determined whether each audio segment in the digital audio signal is a voice, where each audio segment includes a plurality of audio frames.

In an embodiment, step 102 includes: for each audio frame, when the probability that the audio frame is the voice frame is greater than a first preset threshold, determining that the audio frame is the voice frame; and for each audio segment, determining the number of voice frames included in the audio segment, and when the number is greater than a second preset threshold, determining that the audio segment is the voice.

The values of the first and second preset thresholds may be set according to experience or the like.

At step 103: when determining that the audio segment is the voice, the VAD decoding layer indicates to input a deep feature of the audio segment into a voice wake-up decoding layer to perform voice wake-up.

In some embodiments, an output of the voice wake-up decoding layer may be a probability of detecting a preset wake-up word. If the probability is greater than a preset probability value, a voice wake-up result is determined to be successful wake-up, otherwise, the voice wake-up result is determined to be failed wake-up.

In the embodiments, the deep feature of the digital audio signal is extracted, the probability that each audio frame in the digital audio signal is a voice frame, and it is determined whether the audio segment is a voice according to the probability. Only the deep feature of the audio segment determined as the voice is inputted into the voice wake-up decoding layer to perform voice wake-up, thereby improving the accuracy of voice wake-up.

In some embodiments, the deep feature described in step 101 is obtained by a following method. The VAD encoding layer performs VAD encoding and voice wake-up encoding on the collected digital audio signal and extracts the deep feature of the digital audio signal.

In some embodiments, the VAD encoding layer includes sequentially connected two fully connected layers, one one-dimensional convolutional layer, one fully connected layer and one one-dimensional convolutional layer. The VAD decoding layer includes one fully connected layer.

In the embodiments, VAD encoding and voice wake-up encoding can be simultaneously realized by sharing one VAD encoding layer. Compared with a method using two networks to realize VAD encoding and voice wake-up encoding, a calculation amount of the whole voice wake-up process can be greatly reduced. Further, the digital audio signal in a time domain is directly inputted into the VAD encoding layer without performing Fbank or Mel feature extraction on the digital audio signal before VAD encoding, the process of extracting a front-end feature of the digital audio signal in the time domain can be omitted, thereby reducing the occupation of hardware resources, and improving the voice wake-up speed. Therefore, the method is very suitable for voice wake-up on a device with less hardware resources.

In an embodiment, a voice wake-up decoding layer neural network model includes sequentially connected two two-dimensional convolutional layers, one pooling layer, and one fully connected layer.

In some implementations, in order to improve the accuracy and precision of voice detection, and ultimately improve the accuracy of voice wake-up, the length of each audio segment is usually less than the length of a preset wake-up word. For example, the length of an audio segment is 100 ms (milliseconds), and the length of the wake-up word is 1s (second). That is, the dimension of an output layer of the VAD encoding layer is different from the dimension of an input layer of the voice wake-up decoding layer neural network model. Therefore, before inputting the deep feature outputted by the VAD encoding layer into the voice wake-up decoding layer neural network model, a dimension conversion process should be performed, so that the voice wake-up decoding layer neural network model can completely detect the wake-up word. In some implementations, the dimension conversion process may be implemented in the following manners.

In an embodiment, the step of the VAD decoding layer indicating to input the deep feature of the audio segment into the voice wake-up decoding layer (i.e., the voice wake-up decoding layer neural network model) described in step 103 includes: when the VAD decoding layer determines that the audio segment is the voice, indicating to cache the deep feature, and when the length of each audio segment is less than a preset length value, and a total length of a plurality of audio segments that are determined as voices and have not been wakened up is greater than or equal to the preset length value, the VAD decoding layer indicating the VAD encoding layer to input deep features of the plurality of audio segments into the voice wake-up decoding layer. The preset length value is greater than or equal to the length of the preset wake-up word.

In some implementations, voice wake-up may succeed or fail. There may be a plurality of wake-up words. When the deep feature of an audio segment is inputted into the voice wake-up decoding layer, if the wake-up fails, reasons for wake-up failure may be as follows. For example, at least one wake-up word appears at the end of the audio segment, and only includes a front part (e.g., one or several) of the plurality of wake-up words, while a later part (e.g., one or several) of the plurality of wake-up words is included in another audio segment corresponding to a next inputted deep feature. That is, some wake-up words used for voice wake-up may appear in the first half of a voice or in the second half of the voice. In order to avoid missing one or more wake-up words, save memory, facilitate the reading of the deep feature, and speed up the whole voice wake-up process, the embodiments of the present disclosure provide following optimization solutions.

The step of performing voice wake-up described in step 103 includes: when the voice wake-up succeeds, indicating to clear the deep feature in a cache; when the voice wake-up fails and it is detected that the audio segment includes at least one wake-up word, indicating to retain the deep feature in the cache; and when the voice wake-up fails and it is detected that the audio segment does not include at least one wake-up word, indicating to clear the deep feature in the cache.

In an embodiment, after determining whether each audio segment in the digital audio signal is a voice frame in step 102, the method further includes: if the audio segments is not a voice, clearing the deep feature of the audio segment in the cache.

In an embodiment, the step of performing voice wake-up described in step 103 includes: when the voice wake-up result is determined to be failed wake-up, indicating to clear a feature with the preset length at the beginning of the deep feature in the cache. A value of the preset length may be determined according to a following method. When a part of deep feature of the wake-up word is located at the end of the deep feature inputted into the voice wake-up decoding layer, the value of the preset length is determined according to the length of the part of deep feature. For example, if the length of the deep feature inputted into the voice wake-up decoding layer is n, and a part of the deep feature of the wake-up word is located at the end of the deep feature inputted into the voice wake-up decoding layer, the length of the part of the deep feature is generally not greater than m, where m<n. Then, if the wake-up fails, at least the deep feature with the length m located at the end of the deep feature inputted into the voice wake-up decoding layer is retained, so as to ensure that the deep feature of the wake-up word is not lost. Therefore, the above preset length may be set to n-m. Here is just an example. In another embodiment, if the voice wake-up result is determined to be failed wake-up, it is indicated to clear a feature with the preset length at the end of the deep feature in the cache. Meanwhile, a part of deep feature of the wake-up word is located at the beginning of the deep feature inputted into the voice wake-up decoding layer. The step of indicating to input the deep feature of the audio segment into the voice wake-up decoding layer described in step 103 includes: indicating the VAD encoding layer to sequentially read deep features according to an order of extraction time of the deep features from first to last, and input them to the voice wake-up decoding layer.

When the deep features are outputted from the VAD encoding layer to the cache, after the above processing, the deep features in the cache are all stored sequentially according to the order of the extraction time from first to last. Each time the deep features are read from the VAD encoding layer and inputted to the voice wake-up decoding layer, the deep features are also sequentially inputted to the voice wake-up decoding layer according to the order of the extraction time from first to last.

In an embodiment, the VAD encoding layer and the VAD decoding layer are both included in the VAD neural network model, and the VAD neural network model and the voice wake-up decoding layer neural network model are obtained by a following training process.

Each audio frame of a collected digital audio signal sample is labeled to indicate whether it is a voice frame.

The sample is divided into a plurality of audio groups according to a first preset length value. Each of the plurality of audio groups is labeled to indicate whether wake-up succeeds or fails. The first preset length value is greater than or equal to the length of the preset wake-up word. For any audio group, if the audio group includes a wake-up word, the audio group is labeled as successful wake-up, otherwise, the audio group is labeled as failed wake-up.

One or more audio frames in the sample is inputted into the VAD encoding layer, an expected output of the VAD decoding layer is set according to a label for indicating whether each audio frame is a voice frame, and the deep feature outputted by the VAD encoding layer is stored in the cache.

When the audio frame is labeled as a voice frame, the VAD encoding layer sequentially reads the deep features of the audio groups and inputs them into the voice wake-up decoding layer neural network model. An expected output of the voice wake-up decoding layer neural network model is set according to a label for indicating whether the audio group corresponding to the inputted deep feature is successfully or unsuccessfully wakened up.

When the output of the voice wake-up decoding layer neural network model satisfies a preset convergence condition, the training is stopped, and the VAD neural network model and the voice wake-up decoding layer neural network model at this moment are used as the final VAD neural network model and voice wake-up decoding layer neural network model.

Figure 2:
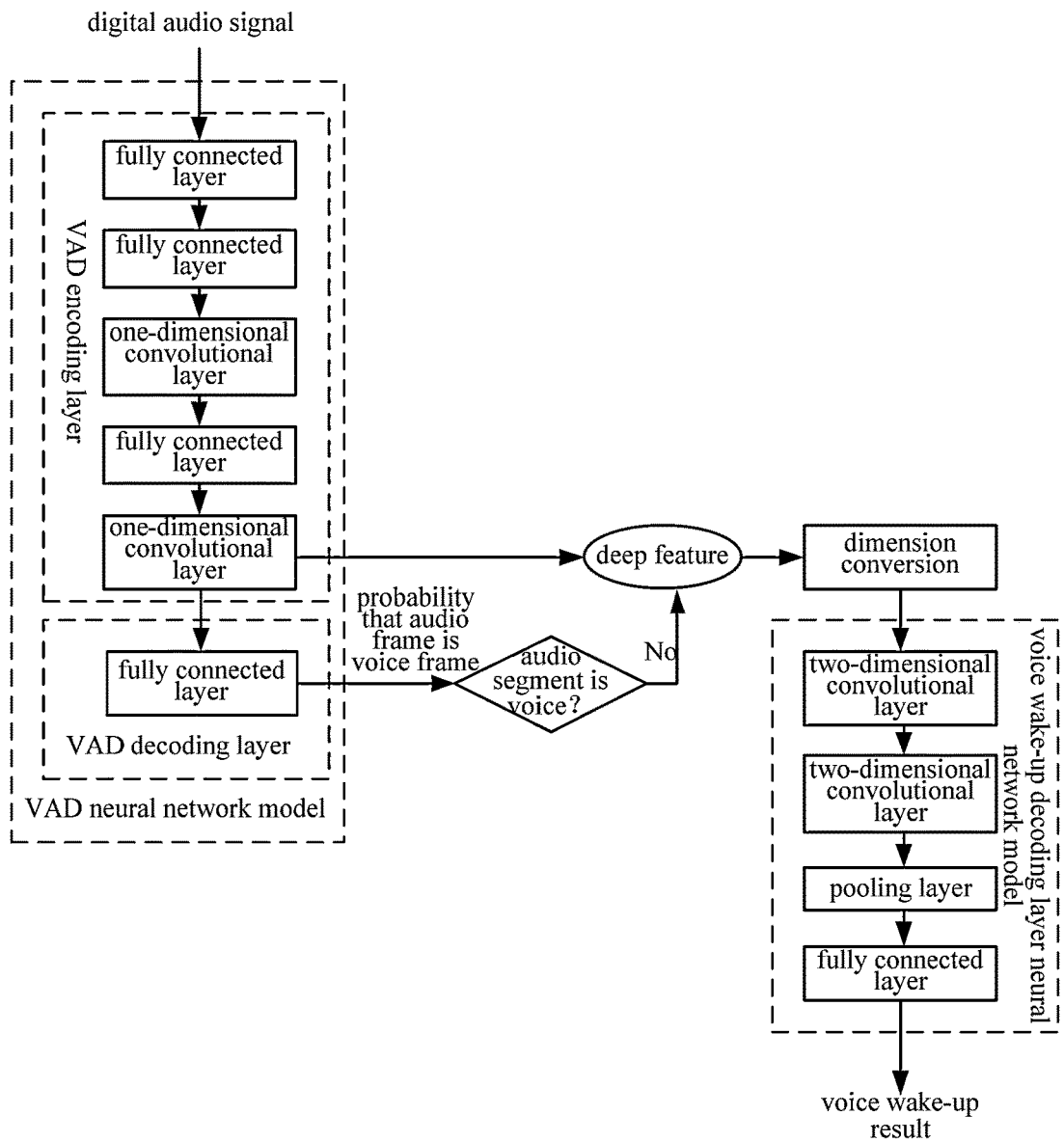
FIG. 2 is a diagram illustrating structures and working processes of a VAD neural network model and a voice wake-up decoding layer neural network model according to some embodiments of the present disclosure.

FIG. 2 shows structures and working processes of the VAD neural network model and the voice wake-up decoding layer neural network model according to some embodiments of the present disclosure. An input of the VAD encoding layer is a digital audio signal in the time domain. The VAD encoding layer not only performs the process of VAD encoding but also performs the process of voice wake-up encoding. An output of the last layer of the VAD encoding layer (the output is the deep feature of the inputted digital audio signal) is cached, used as the input of the VAD decoding layer, and it is determined whether an audio segment is a voice according to a probability that each audio frame outputted by the VAD decoding layer is a voice frame. When the audio segment is not a voice, the deep feature of the audio segment is cleared from the cache, and only the deep feature of the audio segment that is determined as a voice is inputted into the voice wake-up decoding layer neural network model to perform voice wake-up. The dimension conversion needs to be performed when the deep feature of an audio segment with the first preset length value is extracted from the VAD encoding layer and is inputted into the voice wake-up decoding layer neural network model, so that the dimension of the deep feature inputted into the voice wake-up decoding layer neural network model meets the requirements of the input layer of the voice wake-up decoding layer neural network model.

An application example of the present disclosure is described below.

At step 01, a collected original audio signal is sampled at a sampling rate of 8k HZ to obtain a digital audio signal.

The sampling rate is 8k HZ, which means sampling 8k sample points from the original audio signal every one second.

At step 02, if the length of each audio segment is 100 ms, the dimension of the digital audio signal obtained by sampling is [1,800]. Where, the "1" corresponds to a first dimension, i.e., an audio segment dimension, which represents one audio segment, and the "800" corresponds to a second dimension, i.e., a sampling point dimension, which represents the number of sampling points included in one audio segment (100 ms), that is, 800 sampling points. Since the audio segment is to be inputted into the VAD encoding layer of the VAD neural network model, it is necessary to perform dimension conversion on the audio segment, that is, convert the dimension [1,800] into a dimension [1,10,80]. Where, the "1" corresponds to the first dimension, i.e., the audio segment dimension, which represents one audio segment. The "10" corresponds to the second dimension, i.e., an audio frame dimension, which represents that each audio segment of 100 ms is divided into 10 frames, with each frame being 10 ms. The "80" corresponds to a third dimension, i.e., the sampling point dimension, which represents the number of sampling points included in each frame (10 ms).

At step 03, the digital audio signal is inputted to the VAD neural network model in the dimension [1,10,80].

In some embodiments, the VAD encoding layer includes sequentially connected two fully connected layers, one one-dimensional convolutional layer, one fully connected layer, and one one-dimensional convolutional layer. The fully connected layers perform encoding in the third dimension (i.e., the sampling point dimension) (that is, on all sampling points in one audio segment), and the one-dimensional convolutional layers perform encoding in the second dimension (i.e., the audio frame dimension) (that is, on each audio frame of one audio segment). The VAD encoding layer finally outputs the deep feature of each audio frame, and the deep feature of each audio frame outputted by the VAD encoding layer is putted into the cache.

The VAD decoding layer decodes the deep features outputted by the VAD coding layer. In some embodiments, the VAD decoding layer includes one fully connected layer, which performs decoding in the third dimension. The VAD decoding layer output a voice probability of each audio frame (that is, the probability that each audio frame is a voice frame).

At step 04, for each audio frame, if the voice probability of the audio frame is greater than a first preset threshold, the audio frame is determined as the voice frame; otherwise, the audio frame is determined as a non-voice frame; for each audio segment, the number of voice frames included in the audio segment is determined; if the number of voice frames is greater than a second preset threshold, the audio segment is determined as a voice, and the deep feature of the audio segment in the cache is retained; otherwise, the audio segment is determined as a non-voice, and the deep feature of the audio segment which is the non-voice in the cache is cleared.

At step 05, the deep features of the audio segment with the first preset length value are sequentially read from the VAD encoding layer and inputted into the voice wake-up decoding layer neural network model to obtain a voice wake-up result. If the voice wake-up result is determined to be successful wake-up, the deep features read from the cache in step 05 may be found in the cache and cleared from the cache; if the voice wake-up result is determined to be failed wake-up, the deep features read from the cache in step 05 may be found in the cache, the deep features having a preset length and including at least one wake-up word are retained, and other deep features are cleared from the cache.

After the above processing, the deep feature of the audio segment which is the non-voice, the deep feature of the audio segment that has been successfully wakened up, and the deep feature that does not include at least one wake-up word in the deep features of the audio segment that has been unsuccessfully wakened up, all have been removed from the cache. As a result, the remaining deep features in the cache are all features which need to be used in the subsequent voice wake-up process. Afterwards, the deep features are sequentially read from the VAD encoding layer and inputted into the voice wake-up decoding layer neural network model to perform voice wake-up.

In some embodiments, the first preset length value is 1s, that is, each time the deep features of 100 audio frames with the length of 10 ms are inputted into the voice wake-up decoding layer neural network model.

In some embodiments, the voice wake-up decoding layer neural network model includes sequentially connected two two-dimensional convolutional layers, one pooling layer, and one fully connected layer.

The voice wake-up decoding layer neural network model outputs a probability of voice wake-up. If the probability is greater than a preset probability value, it is determined that the voice wake-up succeeds; otherwise, it is determined that the voice wake-up fails.

Figure 3:
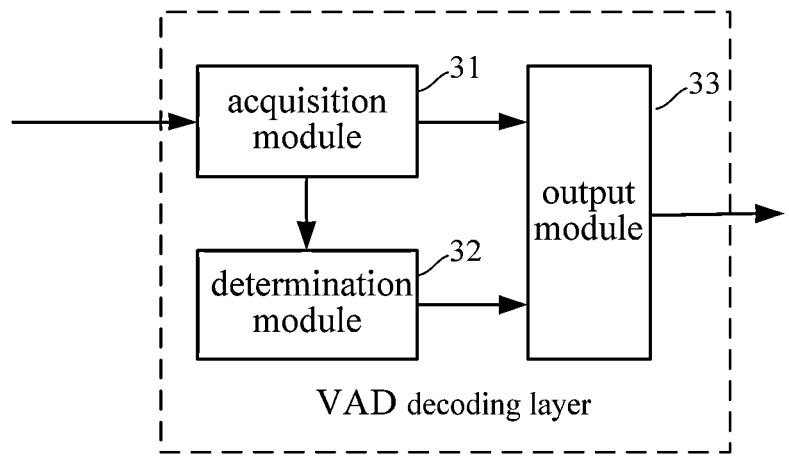
FIG. 3 is a diagram illustrating a structure of a VAD decoding layer according to some embodiments of the present disclosure.

FIG. 3 is a diagram illustrating a structure of a VAD decoding layer according to some embodiments of the present disclosure. The VAD decoding layer, also called a VAD decoding apparatus, may be applied in an electronic device and is configured to perform the voice wake-up method. The apparatus may include an acquisition module 31, a determination module 32, and an output module 33.

The acquisition module 31 is configured to acquire a deep feature encoded by a VAD encoding layer, the deep feature being extracted from a digital audio signal used for VAD encoding and voice wake-up encoding.

The determination module 32 is configured to detect a probability that each audio frame in the digital audio signal is a voice frame according to the deep feature acquired by the acquisition module 31, and determine whether each audio segment in the digital audio signal is a voice according to the probability, each audio segment including a plurality of audio frames.

The output module 33 is configured to, when the determination module 32 determines that the audio segment is the voice, indicate the acquisition module 31 to input a deep feature of the audio segment into a voice wake-up decoding layer to perform voice wake-up.

In an embodiment, the determination module 32 is configured to determine that the audio frame is the voice frame when the probability that the audio frame is the voice frame is greater than a first preset threshold; for each audio segment, determine the number of voice frames included in the audio segment, and when the number is greater than a second preset threshold, determine that the audio segment is the voice.

In an embodiment, when the determination module 32 determines that the audio segment is the voice, the output module 33 indicates to cache the deep feature, and when the length of each audio segment is less than a preset length value, and the total length of a plurality of audio segments that are determined as voices and have not been wakened up is greater than or equal to the preset length value, indicates the VAD encoding layer to input the deep features of the a plurality of audio segments into the voice wake-up decoding layer. Where, the preset length value is greater than or equal to the length of a preset wake-up word.

In an embodiment, when the voice wake-up succeeds, the output module 33 indicates to clear the deep feature in the cache. When the voice wake-up fails and it is detected that the audio segment includes at least one wake-up word, the output module 33 indicates to retain the deep feature in the cache. When the voice wake-up fails and it is detected that the audio segment does not include at least one wake-up word, the output module 33 indicates to clear the deep feature in the cache.

Embodiments of the present disclosure also provide a voice wake-up system, including the VAD encoding layer, the voice wake-up decoding layer, and the VAD decoding layer as described above. In an embodiment, the voice wake-up system may be applied in an electronic device and is configured to perform the above voice wake-up method.

In an embodiment, the VAD encoding layer includes sequentially connected two fully connected layers, one one-dimensional convolutional layer, one fully connected layer, and one one-dimensional convolutional layer. The VAD decoding layer includes one fully connected layer. The voice wake-up decoding layer includes sequentially connected two two-dimensional convolutional layers, one pooling layer, and one fully connected layer.

Embodiments of the present disclosure also provide a computer program product, including a computer program or instructions which, when executed by a processor, cause the processor to perform the steps of the voice wake-up method as described in the above embodiments.

Embodiments of the present disclosure also provide a non-transitory computer-readable storage medium storing instructions which, when executed by a processor, cause the processor to perform the steps of the voice wake-up method as described above. In some implementations, the computer-readable storage medium may be a storage medium included in the devices/apparatuses/system of the embodiments described above or may be a storage device that exists separately and is not assembled into the devices/apparatuses/system. The computer-readable storage medium stores instructions which, when executed by the processor, cause the processor to perform the steps of the voice wake-up method as described above.

According to the embodiments disclosed in the present disclosure, the computer-readable storage medium may be a non-transitory computer-readable storage medium, such as may include, but is not limited to a portable computer diskette, hard disk, random access memory (RAM), read-only memory (ROM), erasable programmable read-only memory (EPROM or flash memory), portable compact disk read-only memory (CD-ROM), optical storage device, magnetic storage device, or any suitable combination thereof, which is not intended to limit the scope of the present disclosure. In the embodiments of the present disclosure, the computer-readable storage medium may be any tangible medium that includes or stores a program that may be used by or in combination with an instruction execution system, apparatus, or device.

Figure 4:
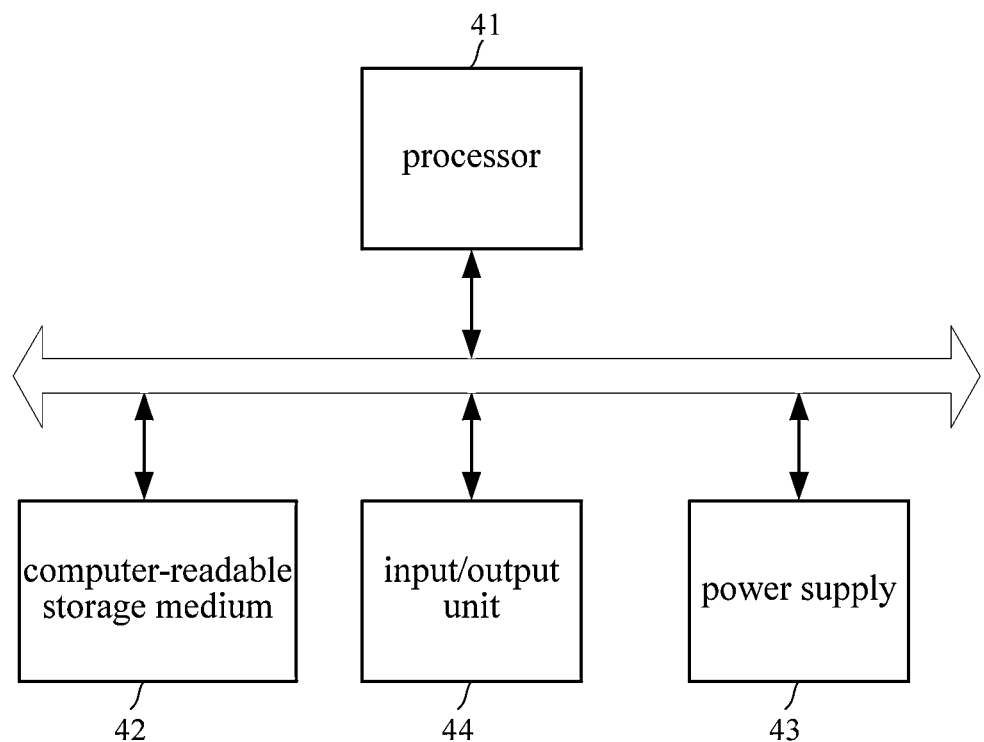
FIG. 4 is a diagram illustrating an exemplary structure of an electronic device according to some embodiments of the present disclosure.

As shown in FIG. 4, embodiments of the present disclosure also provide an electronic device. FIG. 4 shows a diagram illustrating an exemplary structure of the electronic device according to some embodiments of the present disclosure. The electronic device is described as follows.

The electronic device may include a processor 41 including one or more processing cores, a memory 42 including one or more computer-readable storage mediums, and a computer program stored on the memory 42 and executable on the processor 41. When executing the program stored on the memory 42, the above voice wake-up method can be implemented.

In some implementations, the electronic device may further include a power supply 43, an input/output unit 44 and so on. The skilled person in the art can understand that the structure of the electronic device shown in FIG. 4 cannot constitute a limitation on the electronic device, and the electronic device may include more or fewer components than that shown in FIG. 4, or a combination of some components, or components with different arrangements.

The processor 41 is a control center of the electronic device, which connects various parts of the electronic device via various interfaces and lines. Through running or executing software programs and/or modules stored in the memory 42 and calling data stored in the memory 42, the processor 41 executes various functions of a server and processes the data, thereby monitoring the electronic device as a whole.

The memory 42, i.e., the above computer-readable storage medium, may be configured to store the software programs and modules. The processor 41 may execute various functional applications and perform data processing by running the software programs and modules stored in the memory 42. The memory 42 may include a program storage area and a data storage area. The program storage area may store an operating system, an application program required for at least one function, etc. The data storage area may store data created according to the use of the server, etc. In addition, the memory 42 may include a high-speed random access memory and a non-transitory memory, such as at least one magnetic disk storage device, flash memory device, or other transitory solid state storage device. Correspondingly, the memory 42 may also include a memory controller, to enable the processor 41 to access the memory 42.

The electronic device also includes a power supply 43 that supplies power to various components, which may be connected to the processor 41 through a power management system, so that functions such as charging, discharging and power consumption management can be implemented through the power management system. The power supply 43 may also include one or more direct current or alternating current power supplies, a recharging system, a power failure detection circuit, a power converter or inverter, a power status indicator, and any other components.

The electronic device may also include the input/output unit 44. The input/output unit 44 may be configured to receive inputted numerical or character information, and generate a keyboard, a mouse, a joystick, and an optical or trackball signal input related to user setting and function control. The input/output unit 44 may also be configured to display information inputted by a user or information provided to the user, as well as various graphic user interfaces that may include graphics, texts, icons, videos, and any combination thereof.

The flowcharts and block diagrams in the accompanying drawings of the present disclosure show the architecture, functions, and operations that may be implemented by the system, method, and computer program product according to the embodiments of the present disclosure. Each block in the flowcharts or block diagrams may represent a module, a program segment, or a part of codes, which includes one or more executable instructions for implementing specified logical functions. It should be noted that in some alternative implementations, the functions marked in the blocks may occur in an order different from that described in the accompanying drawings. For example, two connected blocks may be performed in parallel, or sometimes they may be performed in a reverse order, depending on the involved functions. It should also be noted that each block in the block diagrams or flowcharts, and combinations of blocks in the block diagrams or flowcharts may be implemented by a dedicated hardware-based system which may perform the specified functions or operations or may be implemented by a combination of dedicated hardware and computer instructions.

The skilled person in the art can understand that the features described in the embodiments and/or claims of the present disclosure can be combined in a variety of ways, even if such combinations are not explicitly described in the present disclosure. In particular, the features described in the embodiments and/or claims of the present disclosure may be combined in a variety of ways without departing from the spirits and teachings of the present disclosure, and all of which fall within the scope of the present disclosure.

The principles and implementations of the present disclosure are described herein through specific embodiments. The above embodiments are only used to understand the method of the present disclosure and its core ideas, and are not intended to limit the present disclosure. For the skilled person in the art, the specific implementations and application scope may be modified according to the ideas, spirits and principles of the present disclosure, and any modification, equivalent replacement and improvement should be included in the scope of the present disclosure.

What is claimed is:

1. A voice wake-up method, comprising:
    acquiring a deep feature encoded by a voice activity detection (VAD) encoding layer through a VAD decoding layer, the deep feature being extracted from a digital audio signal used for VAD encoding and voice wake-up encoding;
    determining whether each audio segment in the digital audio signal is a voice according to a probability that each audio frame in the digital audio signal is a voice frame, each audio segment including a plurality of audio frames; and
    when determining that the audio segment is the voice, indicating, by the VAD decoding layer, to input a deep feature of the audio segment into a voice wake-up decoding layer to perform voice wake-up;
    wherein the VAD encoding layer includes two fully connected layers, one one-dimensional convolutional layer, one fully connected layer, and one one-dimensional convolutional layer;
    each fully connected layer performs processing on all sampling points in the audio segment in a sampling point dimension, and each one-dimensional convolutional layers performs processing on each audio frame of the audio segment in an audio frame dimension.

2. The method of claim 1, wherein the determining whether each audio segment in the digital audio signal is a voice according to a probability that each audio frame in the digital audio signal is a voice frame comprises:
    for each audio frame, when the probability that the audio frame is the voice frame is greater than a first preset threshold, determining that the audio frame is the voice frame; and
    for each audio segment, determining the number of voice frames included in the audio segment, and when the number is greater than a second preset threshold, determining that the audio segment is the voice.

3. The method of claim 1, wherein
    the VAD decoding layer includes one fully connected layer.

4. The method of claim 1, wherein the voice wake-up decoding layer includes two two-dimensional convolutional layers, one pooling layer, and one fully connected layer.

5. The method of claim 1, wherein the indicating, by the VAD decoding layer, to input a deep feature of the audio segment into a voice wake-up decoding layer comprises:
    when the VAD decoding layer determines that the audio segment is the voice, indicating to cache the deep feature, and
    when a length of each audio segment is less than a preset length value, and a total length of a plurality of audio segments that are determined as voices and have not been wakened up is greater than or equal to the preset length value, indicating, by the VAD decoding layer, the VAD encoding layer to input deep features of the plurality of audio segments into the voice wake-up decoding layer,
    the preset length value is greater than or equal to a length of a preset wake-up word.

6. The method of claim 5, wherein the performing voice wake-up comprises:
    when the voice wake-up succeeds, indicating to clear the deep feature in a cache;
    when the voice wake-up fails and it is detected that the audio segment includes at least one wake-up word, indicating to retain the deep feature in the cache; or
    when the voice wake-up fails and it is detected that the audio segment does not include at least one wake-up word, indicating to clear the deep feature in the cache.

7. A voice activity detection (VAD) apparatus, comprising:
    an acquisition module, configured to acquire a deep feature encoded by a VAD encoding layer, the deep feature being extracted from a digital audio signal used for VAD encoding and voice wake-up encoding; wherein the VAD encoding layer includes two fully connected layers, one one-dimensional convolutional layer, one fully connected layer, and one one-dimensional convolutional layer; each fully connected layer performs processing on all sampling points in the audio segment in a sampling point dimension, and each one-dimensional convolutional layers performs processing on each audio frame of the audio segment in an audio frame dimension;
    a determination module, configured to determine whether each audio segment in the digital audio signal is a voice according to a probability that each audio frame in the digital audio signal is a voice frame, each audio segment including a plurality of audio frames; and an output module, configured to, when determining that the audio segment is the voice, indicate to input a deep feature of the audio segment into a voice wake-up decoding layer to perform voice wake-up.

8. The VAD apparatus of claim 7, wherein the determination module is configured to determine that the audio frame is the voice frame when the probability that the audio frame is the voice frame is greater than a first preset threshold; for each audio segment, determine the number of voice frames included in the audio segment, and when the number is greater than a second preset threshold, determine that the audio segment is the voice.

9. The VAD apparatus of claim 7, wherein when the audio segment is the voice, the output module is configured to indicate to cache the deep feature, and when a length of each audio segment is less than a preset length value, and a total length of a plurality of audio segments that are determined as voices and have not been wakened up is greater than or equal to the preset length value, indicate the VAD encoding layer to input deep features of the plurality of audio segments into the voice wake-up decoding layer, the preset length value is greater than or equal to a length of a preset wake-up word.

10. The VAD apparatus of claim 7, wherein the output module is configured to, when the voice wake-up succeeds, indicate to clear the deep feature in a cache;

when the voice wake-up fails and it is detected that the audio segment includes at least one wake-up word, indicate to retain the deep feature in the cache; or when the voice wake-up fails and it is detected that the audio segment does not include at least one wake-up word, indicate to clear the deep feature in the cache.

11. A non-transitory computer-readable storage medium storing instructions which, when executed by a processor, cause the processor to perform a voice wake-up method, comprising:

acquiring a deep feature encoded by a voice activity detection (VAD) encoding layer through a VAD decoding layer, the deep feature being extracted from a digital audio signal used for VAD encoding and voice wake-up encoding;

determining whether each audio segment in the digital audio signal is a voice according to a probability that each audio frame in the digital audio signal is a voice frame, each audio segment including a plurality of audio frames; and when determining that the audio segment is the voice, indicating, by the VAD decoding layer, to input a deep feature of the audio segment into a voice wake-up decoding layer to perform voice wake-up;

wherein the VAD encoding layer includes two fully connected layers, one one-dimensional convolutional layer, one fully connected layer, and one one-dimensional convolutional layer;

each fully connected layer performs processing on all sampling points in the audio segment in a sampling point dimension, and each one-dimensional convolutional layers performs processing on each audio frame of the audio segment in an audio frame dimension.

12. The non-transitory computer-readable storage medium of claim 11, wherein the determining whether each audio segment in the digital audio signal is a voice according to a probability that each audio frame in the digital audio signal is a voice frame comprises:

for each audio frame, when the probability that the audio frame is the voice frame is greater than a first preset threshold, determining that the audio frame is the voice frame; and for each audio segment, determining the number of voice frames included in the audio segment, and when the number is greater than a second preset threshold, determining that the audio segment is the voice.

13. The non-transitory computer-readable storage medium of claim 11, wherein the VAD decoding layer includes one fully connected layer.

14. The non-transitory computer-readable storage medium of claim 11, wherein the voice wake-up decoding layer includes two two-dimensional convolutional layers, one pooling layer, and one fully connected layer.

15. The non-transitory computer-readable storage medium of claim 11, wherein the indicating, by the VAD decoding layer, to input a deep feature of the audio segment into a voice wake-up decoding layer comprises:

when the VAD decoding layer determines that the audio segment is the voice, indicating to cache the deep feature, and when a length of each audio segment is less than a preset length value, and a total length of a plurality of audio segments that are determined as voices and have not been wakened up is greater than or equal to the preset length value, indicating, by the VAD decoding layer, the VAD encoding layer to input deep features of the plurality of audio segments into the voice wake-up decoding layer, the preset length value is greater than or equal to a length of a preset wake-up word.

16. The non-transitory computer-readable storage medium of claim 15, wherein the performing voice wake-up comprises:

when the voice wake-up succeeds, indicating to clear the deep feature in a cache;

when the voice wake-up fails and it is detected that the audio segment includes at least one wake-up word, indicating to retain the deep feature in the cache; or when the voice wake-up fails and it is detected that the audio segment does not include at least one wake-up word, indicating to clear the deep feature in the cache.

\* \* \* \* \*